United States Patent [19]

Clark et al.

[11] Patent Number: 4,602,060
[45] Date of Patent: Jul. 22, 1986

[54] TWO-COMPONENT MOLD RELEASE SYSTEM AND METHOD

[75] Inventors: Sheldon L. Clark, Boca Raton; Frank P. Pajaujis, Deerfield Beach, both of Fla.

[73] Assignee: Frekote, Inc., Boca Raton, Fla.

[21] Appl. No.: 488,018

[22] Filed: Apr. 25, 1983

[51] Int. Cl.$^4$ ................................. C09D 5/00
[52] U.S. Cl. ..................... 524/745; 524/748; 524/778; 524/795; 524/857; 524/863; 524/767; 106/38.24
[58] Field of Search ............ 106/287.16, 38.24, 38.22; 252/33.6, 42; 521/51; 524/795, 857, 863, 778, 745, 748, 767; 528/29; 427/135; 264/338

[56] References Cited

U.S. PATENT DOCUMENTS

| | | | |
|---|---|---|---|
| 3,341,646 | 9/1967 | Britain | 264/338 |
| 3,498,824 | 3/1970 | Chadha | 427/408 |
| 3,624,190 | 6/1967 | Cekada | 264/338 |
| 3,684,756 | 8/1972 | Brooks | 106/38.22 |
| 3,836,502 | 9/1974 | Schulz | 524/863 |
| 3,848,037 | 11/1974 | Harper | 264/338 |
| 3,860,521 | 1/1975 | Aepli | 252/49.3 |
| 3,883,628 | 5/1975 | Martin | 106/38.22 |
| 3,893,868 | 7/1975 | Klement | 264/338 |
| 3,931,381 | 1/1976 | Lindberg | 264/338 |
| 3,935,291 | 1/1976 | Jackson | 264/338 |
| 3,992,502 | 11/1976 | Krishnan | 264/338 |
| 4,011,362 | 3/1977 | Stewart | 427/387 |
| 4,024,088 | 5/1977 | Godlewski | 521/168 |
| 4,038,088 | 7/1977 | White | 427/135 |
| 4,110,119 | 8/1978 | Boehmke | 427/135 |
| 4,111,861 | 9/1978 | Godlewski | 521/125 |
| 4,220,727 | 9/1980 | Godlewski | 521/110 |
| 4,244,912 | 1/1981 | Battice | 264/338 |
| 4,312,672 | 1/1982 | Blanak | 106/38.22 |
| 4,359,340 | 11/1982 | Comper | 106/38.24 |
| 4,366,001 | 12/1982 | Ona | 524/356 |
| 4,379,100 | 4/1983 | Salisbury | 264/338 |
| 4,396,729 | 8/1983 | Dominquez | 521/51 |
| 4,473,403 | 9/1984 | Wesala | 427/135 |

FOREIGN PATENT DOCUMENTS

| | | | |
|---|---|---|---|
| 2702930 | 7/1978 | Fed. Rep. of Germany | 264/338 |
| 58-45297 | 3/1983 | Japan | 106/38.22 |

Primary Examiner—C. Warren Ivy
Attorney, Agent, or Firm—Willian Brinks Olds Hofer Gilson & Lione

[57] ABSTRACT

A two-stage system can provide a water-soluble releasing interface which permits a plurality of cycles of the mold between applications with such reaction-injection molding materials as reinforced urethane. The two-coat release system provides on the mold surface a base coat, including a polymer release agent with groups capable of bonding to the mold surface (e.g., a carboxy-terminated silicone) and a bonding or cross-linking agent (e.g., tetraisopropyltitanate), which reacts with and cross links the polymer and provides bonding with the mold surface and for soap-like materials, and a top coat, which is a water-soluble soap-like material (e.g., a water-soluble metallic salt of long-chain fatty acid). Such a system can be particularly adapted for use with urethane RIM materials.

24 Claims, No Drawings

TWO-COMPONENT MOLD RELEASE SYSTEM AND METHOD

BACKGROUND OF THE INVENTION

This invention is directed to a system and method employing two, sequentially applied materials to facilitate the release of a molded article from the mold surface, and to a system and method which is particularly advantageous for providing a water-soluble releasing interface having a permanence permitting the manufacture of a plurality of molded articles by reaction injection molding, most particularly with reinforced and unreinforced urethane materials, between applications of the release system.

In the injection-molding of plastic parts, it is generally advisable to provide a release agent on the surface of the mold to facilitate the release and removal of the molded part from the mold. It is desirable in any injection-molding operation that a multiplicity of mold cycles is obtained between applications of the release agent. In the past, a number of release agents have been available to permit such operation; for example, such release agents include those sold by FreKote, Inc., under its trademarks.

Investigation of reaction-injection molding, now referred to as RIM, was undertaken by both chemical and equipment suppliers in the middle 1960's. The reaction-injection molding process involves the injection molding of parts from highly reactive liquid components of a chemical system. Reaction-injection molding was of particular interest in the automotive industry which, in its efforts to comply with the United States government regulations on achieving higher mileages for its automobiles and on collision standards for its bumper systems, faced the problem of reducing body weight and producing resilient front-end parts associated with its bumper systems. As a result of this developing interest in the automotive industry, many chemical companies became heavily involved in formulating systems using urethane intermediates for molding large elastomeric automotive parts. In the early 1970's, suitable machinery for reaction-rejection molding became available; and small-scale production was started.

By the model year 1975, several automobile manufacturers were manufacturing reaction-injection molded urethane parts; and an increasing demand has developed in succeeding years for the use of RIM elastomers in producing not only the resilient parts associated with automotive bumper systems, but spoilers, air dams, wheel flares, and other body parts as well. More recently, urethane elastomers have been provided with reinforcement, such as glass fibers to extend the use of the RIM process for molding exterior body parts, such as fenders and door panels. The reinforcement of the RIM elastomers has provided increased stiffness, has reduced the thermal expansion of molded parts, and has extended the weight advantages of RIM materials such as urethane to many parts of the automobile body.

While the introduction of the RIM process into commercial manufacturing operations has been pioneered by the automotive industry, the RIM process is not limited to the production of automotive parts. The continuing development and introduction of RIM molding materials extends reaction-injection molding to the production of a wide variety of non-automotive parts.

The reaction-injection molding process is experiencing growth in its application and use because of many advantages. Reaction-injection molding permits low mold pressures and low mold temperatures. The low injection molding pressures reduce the clamping force required at the mold and low molding temperatures mean significantly lower energy requirements compared with other molding processes. Reaction-injection molding requires reduced heat energy because many of the chemical reactions, for example those obtained with urethane materials, are exothermic, reducing the amount of heat that is needed to maintain proper mold temperature. Mold costs are substantially reduced with reaction-injection molding. Both thin and heavy wall sections are attainable with parts manufactured by reaction-injection molding. Furthermore, reaction-injection molding permits parts that are generally free from flow and stress lines and also free from molded-in stresses which cause warpage and stress cracking. Complex shapes and variable wall thicknesses and ribbing are readily obtainable in RIM-molded parts, and it is possible to mold very large parts in a single operation, eliminating the need for smaller parts and subassembly steps.

In spite of all its advantages, the reaction-molding process has been burdened with one continuing problem: the release of the molded part from the mold surface. The reaction-injection molding process requires the injection of highly reactive chemical intermediates directly into the mold. The mold surface and any release agent applied to the mold surface are thus exposed to the reactive chemical components of the system and to their exothermic reaction. In addition, the presence of reinforcing materials, such as glass fibers has gravely aggravated the problem by introducing their abrasive action on any release agents placed on the mold surface. The abrasive removal of release agents from the mold surface by reinforcing materials exposes the mold surface itself to the reactive components and their reaction.

This problem has inhibited the adoption of the otherwise highly attractive RIM process. It increases the time necessary to produce parts by the RIM process and thus increases the cost of the resulting parts. For example, the cycle time for the production of a single-urethane part can be on the order of 60 to 120 seconds, which is generally typical for RIM urethane-molding systems. The application of release agent to the mold surface generally takes 30 to 60 seconds of that total time. Thus, if a satisfactory release agent were avilable, the production time for RIM urethane parts could be reduced by the time required for application of the release agent. With the best release agents available prior to this invention, however, only one or two urethane parts could be produced by the RIM process before it became necessary to recoat the mold surface with a release agent. In addition, with the prior release agents, it became necessary to cease production frequently and clean the mold to remove the release agent from those areas in which it builds up.

The release agents which have been in use with reaction-injection molding have been generally waxes or soaps applied in one coating. The soaps have generally provided only one release and have generally required that the mold be coated after each cycle; i.e., after the production of each molded part. Since the soaps are not uniformly removed from the mold with each molded part, an excessive build-up of soap develops on differing areas of the mold; and it becomes necessary, from time to time, that the mold be removed from production and cleaned. The time-consuming and wasteful applications of soaps with each cycle of the mold and the removal of the mold from production for cleaning interrupt production of RIM molded parts and substantially increase their costs.

Waxes have been used in an effort to obtain more than one cycle between applications of the release agent. While waxes have generally provided more than one cycle of the mold, and thus more than one part between applications of the release agent, the parts Cobtained from wax-coated molds have required solvent washing to remove the wax from the surface.

In the automotive industry, particularly, RIM-molded parts are generally part of the body shell and must be painted. Painting, and the resulting finish, of an automotive body must be of the highest possible quality since the cosmetic appearance of the automobile body is believed to be critical to the sale of automobiles. The presence of any wax on a molded part prevents a satisfactory finish. Solvent-washing each part is costly, time-consuming, and imposes a potentially hazardous step in the manufacture of such parts.

Thus, manufacturers seeking to introduce the reaction-injection molding process into their manufacturing operations in an effort to achieve the advantages accompanying the use of such a process have been retarded prior to this invention by the problem of part removal from the mold surface and a lack of any satisfactory release agent for the RIM process. Only soaps, with the attendant cost associated with their repeated application to the mold surface and the cleaning associated with their build-up in the mold, and waxes, with the requirement for solvent cleaning of the resulting molding parts, have been available to the manufacturer prior to this invention.

SUMMARY OF THE INVENTION

It has been discovered that the unitary two-stage or two-coat release system of this invention can provide a water-soluble releasing interface which permits a plurality of cycles of the mold between applications with such reaction-injection molding materials as reinforced urethane. The two-coat release system provides on the mold surface a base coat, including a polymer release agent with groups capable of bonding to the mold surface and a bonding and cross-linking agent which reacts with and cross links the polymer and provides bonding with the mold surface and for soap-like materials, and a top coat, which is a water-soluble soap-like material, preferably a water-soluble metallic salt of long-chain fatty acid. Such a system, particularly as adapted for use with urethane RIM materials, can include the provision of a base coat having carboxy-terminated silicone for the polymer and tetraisopropyltitanate to provide cross-linking and bonding for the soap-like material and a top coat of sodium myristate to provide a releasing interface for the molded urethane parts.

This two-coat release system may be applied to the mold surface a number of ways, but the preferable method is currently believed to be by spraying the two-coat system onto the mold surface as two, successively applied, liquid coatings.

The first part or coating of the system is provided by placing the polymer/bonding and cross-linking agent of the base coat in solution in, preferably, a volatile carrier to minimize its application time. With the silicone polymertetraisopropyltitanate system preferred for urethanes, such a carrier includes a mixture of an aliphatic hydrocarbon and a chloro-fluorocarbon. The silicone polymer and tetraisopropyltitanate are present in the carrier in a range from about 11.0 percent by weight to about 0.7 percent by weight, and the weight ratio of silicone to tetraisopropyltitanate ranges from about 20 to 1 to about 2 to 1, with higher ratios being preferred.

The second part or coating of the system is provided by placing the water-soluble, soap-like material in a deionized water and alcohol solution. With the preferred top coat, sodium myristate is placed in a solution of deionized water and isopropyl alcohol whose pH was adjusted to a range of from about 8.9 to about 9.0. The total sodium myristate solids in the preferred solution is about 4 percent, and it is desirable to add a non-ionic fluorochemical surfactant to the solution.

Use of the two-part release system of this invention provides a method for molding a plurality of articles from reinforced urethane materials. The inner surface of the mold is provided with a base coat by spraying a heavy coating of the first part onto the mold surface and allowing it to dry. The second part of the release system is then sprayed upon the base coat that is provided on the mold surface. Following application of the two-part release system, the mold can be used for manufacture of a plurality of parts by cycling it repeatedly through its steps of injecting the urethane material and fiber reinforcements, curing the reinforced urethane into a molded article and removing the molded article. After a plurality of such steps, only reapplication of the second part to reinforce the top coat is necessary to prepare the inner surface of the mold for another plurality of cycles.

DETAILED DESCRIPTION OF THE INVENTION

This invention includes the discovery that an effective release system for reaction-injection molding processes can include multiple components in two coats applied to the mold surface and that the base coat can include materials providing effective bonding to both the mold surface and at its exposed surface and that a water-soluble release agent may be thereby bonded to the mold surface and provide a releasing interface over a multiplicity of molding cycles.

The base coat includes two basic components. One of the components is a polymer which is preferably capable of providing a releasing interface. The other component, however, is a reactive material capable of cross-linking the polymer and providing bonding. Such second components are commonly used as thin coatings on a variety of surfaces to improve adhesion. It is believed that the second component in the base coat surprisingly reacts with the functional terminations of the polymer, cross-linking the polymer molecules, and bonds to the surface (i.e., steel, aluminum, epoxy, etc.) of the molds commonly used and provides functionality at the exposed surface of the base coat within the mold for bonding a second releasing agent.

In the system developed for use as a release agent for the reaction-injection molding of urethane materials, the first component of the base coat comprises a carboxy-terminated silicone, a particularly effective carboxy-terminated silicone being that sold by Dow Corning as DC7119. DC7119 fluid is a functional silicone fluid which reacts similarly to carboxylic acid. Its physical properties are as follows:

| Physical Property | Typical Value |
| --- | --- |
| Appearance | Clear fluid |

-continued

| Physical Property | Typical Value |
|---|---|
| Viscosity (@ 25° C.) (CST) | 250 ± 100 |
| Specific gravity at 25° C. | 0.975 ± 0.015 |
| Refractive index @ 25° C. | 1.410 ± 0.02 |
| Equivalent weight | 2400–2900 |

Dow Corning ® DC7119 is insoluble in water, but soluble in non-polar organic solvents such as toluene. The second component of the base coat is a titanate, a particularly effective titanate being tetraisopropyltitanate marketed by E. I. DuPont under their trade name Tyzor TPT. The physical properties of Tyzor TPT tetrapropyltitanate are as follows:

| | |
|---|---|
| Chemical Type | $C_3$ |
| Class | Alkyl |
| Molecular Weight | 284.2 |
| % Ti in Product | 16.8 |
| % in Product as $TiO_2$ | 28.0 |
| Composition | 100% |
| Physical Appearance | Pale yellow liquid |
| Spec. Gravity (25° C.; 77° F.) | 0.955 |
| Approx. Visc. (cps. at 25° C.; 77° F.) | 5 |
| Thickening Point (°C.) | 20 mp |
| (°F.) | 68 mp |
| B.P. of Major Hydrolysis By-Product (°C. at 760 mm) | 82 |
| Flash Point (TAG) | |
| Closed Cup, °C. | 24 |
| Closed Cup, °F. | 75 |
| Open Cup, °C. | 28 |
| Open Cup, °F. | 82 |
| Effect of Water | Extremely rapid hydrolysis |
| Typical Solvent Solubility | Isopropanol |
| | n-Heptane |
| | Trichloroethylene |
| | Benzene |

In creating one part of a coating for application to the mold, these components are placed in a liquid carrier including an aliphatic hydrocarbon, such as Isopar C, a solvent sold under this trademark by Exxon and having a boiling range of 208°–222° F. and a chloro-fluorocarbon such as that sold by E. I. Du Pont under their trademark Freon TF. The physical properties of Isopar C aliphatic hydrocarbon are as follows:

| General Properties | | Test Method |
|---|---|---|
| Bromine index | 6 | ASTM D 2710 |
| Gravity °API | 70.7 | ASTM D 287 |
| Specific gravity @ 15.6°/15.6° C. | 0.700 | ASTM D 1250 |
| Refractive index, 20° C. | 1.39237 | ASTM D 1218 |
| Viscosity, cSt at 25° C. | 0.69 | ASTM D 445 |
| Freezing point, °C. (°F.) | <−57 (<−70) | |
| Color, Saybolt | +30 | ASTM D 156 |
| Heat of vaporization, | | Calculated |
| 25° C. kJ/kg | 307 | |
| at 77° F. Btu/lb | 132 | |
| Specific Heat @ 15.6° C. (60° F.) | | Calculated |
| kJ/kg/°C. (Btu/lb/°F.) | 2.047 (0.489) | |
| Vapor-Pressure psia @ 100° F. | 2.5 | |
| Flash Point, TCC, °C. (°F.) | <4 (<40) | ASTM D 56 |
| Auto Ignition, °C. (°F.) | 399 (750) | ASTM D-2155 |
| Water Solubility @ 25° C. | | |
| Water in hydrocarbon ppm | 60 | Karl Fischer |

The physical properties of Freon TF chlorofluorocarbon are as follows:

| | |
|---|---|
| Chemical Formula | $CCl_2F-CClF_2$ |
| Molecular Weight | 187.4 |
| Boiling Point at One Atmosphere, °F. | 117.6 |
| °C. | 47.6 |
| Freezing Point, °C. | −35 |
| Critical Temperature, °C. | 214.1 |
| Critical Pressure, psia | 495.0 |
| Density at 25° C., lbs/ft.$^3$ | 97.69 |
| Latent Heat of Vaporization at b.p., Btu/lb | 63.12 |
| cal/gram | 35.07 |
| Specific Heat at 21.1° C., Btu/(lb)(°F.) or cal/gram (°C.) Liquid | 0.213 |
| Thermal Conductivity at 21.1° C., Btu/(hr)(ft$^2$)(°F./ft) Liquid | 0.043 |
| Viscosity at 21.1° C., Centipoises Liquid | 0.694 |
| Refractive Index of Liquid at 26.5° C. | 1.355 |
| Surface Tension at 25° C., dynes/cm | 17.3 |
| Solubility of water at 21.1° C., % by wt. | 0.009 |
| Solubility in water at saturation pressure at 21.1° C. % by wt. | 0.017 |
| Toxicity (TWA-ppm) | 1000 |

The ratio of carboxy-terminated silicone to tetraisopropyltitanate lies in a range of about 20:1 to about 2:1. The concentration of the first and second components in this carrier are generally in a range from about 11.0 percent by weight to about 0.7 percent by weight.

While base coats formed from coatings having components lying within the ranges set forth above are superior to those of any known release agent, preferred results are generally obtained with a first coating containing about 5.5 percent to about 11.0 percent by weight of non-volatile materials and a weight ratio of carboxy-terminated silicone to tetraisopropyltitanate of 20:1 to 10:1. Base coats having a ratio of carboxy-terminated silicone to tetraisopropyltitanate of about 10:1 are believed to have somewhat of an advantage in reducing the transfer of silicone to the molded parts in later cycles, as the top coat has been depleted, while base coats having a ratio of 20:1 tend to provide a greater number of releases between applications of the top coat.

The water-soluble top coat, incorporated into the system of this invention with a second part or coating, is preferably a water-soluble, soap-like material. Metallic salts of a long-chain fatty acids are preferred. Such water-soluble, soap-like materials include sodium oleate and, preferably, sodium myristate which is harder and provides more resistance to removal and maintains itself longer on the base coat than sodium oleate. Sodium sulfates of long chain fatty alcohols, such as sodium laurel sulfate, can also be used in some applications. The solids content of such a coating material lies preferably in a range of about 2 percent by weight to about 15 percent by weight, with solids contents in the range of 4 percent to 6 percent being preferred.

The top coat is also placed in a liquid carrier. For example, sodium myristate is placed in solution in a mixture of deionized water and isopropyl alcohol. Deionized water prevents the heavy metals in the water from exchanging with the sodium ion and forming insoluble, heavy-metal salts which precipitate from the solution. The deionized water and isopropyl alcohol carrier is adjusted to provide a pH in the range of from about 8.9 to about 9.0 to assist in placing the sodium myristate in solution. In addition, it has been found that it is preferable that the second coating contain about 4 percent by weight sodium myristate and a non-ionic fluorochemical surfactant such as FC-430, marketed by the 3M Corporation.

The physical properties of FC-430 surfactant are as follows:

| Form | Viscous liquid, 100% active |
|---|---|
| Type | Nonionic |
| Color | Straw to amber |
| Viscosity (Brookfield) @ 25° C. | 15,000 cp (spindle #3 @ 6 rpm) |
| Specific Gravity @ 25° C. | 1.15 |
| Refractive Index @ 25° C. | 1.445 |
| Flash Point (Tag Open Cup) | >300° F. |

The non-ionic fluorochemical surfactant is preferably added to the second coating in quantities of about 1.7 grams per gallon. Surfactants other than FC-430 may function as well.

The use of isopropyl alcohol as a carrier speeds up the vaporization of the carrier of the second coating from the mold surface, and deionized water reduces any hazard that may be associated with the use of isopropyl alcohol.

In using the system above, the first part or coating material such as a solution of carboxy-terminated silicone and tetraisopropyltitanate in the aliphatic hydrocarbon-Freon carrier is sprayed onto the mold surface at an operating temperature which is generally in the range of 140° to 160° F. to create a base coat. A relatively heavy coating, for example, greater than 2 mils, is preferably applied to the mold surface. This coating dries almost on contact to produce a somewhat rough and tacky film. The second part or coating material, such as a solution of sodium myristate in deionized water and isopropyl alcohol, is then sprayed upon the coated mold surface. The second coating dries within a second or two, thereby preparing the mold surface for molding.

The mold then may be used to prepare a plurality of parts. The top coat is clear, colorless (water-like), and has a matt finish. The base coat is yellow in color, satiny, and somewhat tacky. After a sufficient number of cycles to deplete the top coat, the base coat will begin to transfer to the molded parts. Since the polymer incorporated into the base coat is a silicone release agent, depletion of the top coat does not generally interfere with the release of molded parts from the mold, but is not desirable because it can interfere with the paintability of the parts. Thus, in normal operation, the system of the invention provides a plurality of molded parts from the water-soluble top coat and continues to operate with only reapplication of the top coat.

The number of releases obtained from the flat surfaces of molds between reapplications of release agent is substantially greater than the number of releases obtained from those portions of the mold which have deep undercuts and contours. Accordingly, it is frequently unnecessary to apply the top coating to the flat surfaces in each application of the release system.

A comparison of systems and their performance in production can be made on a reaction-injection molding machine for molding placues 18 inches by 30 inches by three-sixteenths inches thick. The systems compared below include a base coat applied from a coating material including Dow Corning DC7119 carboxy-terminated silicone and DuPont Tyzor TPT tetraisopropyltitanate and a top coat including sodium myristate applied from a solution of 4 percent by weight.

| System | Ratio of DC7119 to Tyzor TPT | Releases | Solids Content of Base Material Coating |
|---|---|---|---|
| 1 | 20:1 | >20 | 11.0% |
| 2 | 10:1 | >10 | 11.0% |
| 3 | 20:1 | >13 | 5.5% |
| 4 | 10:1 | >13 | 5.5% |
| 5 | 5:1 | 10 | 5.5% |
| 6 | 2:1 | 9 | 5.5% |
| 7 | 5:1 | 5 | 6.3% |
| 8 | 2:1 | 6 | 7.7% |

With systems including a base coat applied from a coating including DC7119 carboxy-terminated silicone and Tyzor TPT tetraisopropyltitanate in a 20:1 ratio from a coating material with 11 percent by weight solid content, the following comparisons were obtained:

| System | Top Coat | Releases | Solids Content of Top Coating Material |
|---|---|---|---|
| 1 | Sodium Myristate | >20 | 4.0% |
| 2 | Sodium Myristate | 4 | 7.5% |
| 3 | Sodium Myristate | 10 | 10.6% |
| 4 | Sodium Myristate | 3 | 17.3% |
| 5 | Sodium Myristate and Sodium Laurel Sulfate | >10 to >20 | 6.0% |

Systems of this invention can be used in the manufacture of automotive fascia on full-scale RIM production machines. For example, full-scale Chevrolet Monte Carlo Fascia can be molded from urethane RIM materials by reaction-injection molding using the system of this invention; and a plurality of RIM-molded Monte Carlo Fascia can be obtained between applications of release agent. Where the base coat of the system includes DC7119 carboxy-terminated silicone and Tyzor TPT tetraisopropyltitanate in the ratio of 20:1, as a result of application to a Monte Carlo Fascia mold from a coating material including 5.5 percent by weight solids, as many as 10 or more Monte Carlo Fascia can be produced between applications of the top coat, where the top coat includes sodium myristate applied from a second coating including 4 percent by weight of solids.

With the ratio of DC7119 carboxy-terminated silicone to Tyzor TPT tetraisopropyltitanate reduced to 10:1 in the base coat, more than 10 Monte Carlo Fascia can also be produced between applications of the top coat of sodium myristate.

In the production of automotive parts using a urethane system reinforced with glass fiber to the level of 23 percent by weight, six releases of the parts may be obtained from the mold without reapplication of the top coat. With prior systems, one release was difficult to obtain.

Using the system of this invention, the molded parts can be washed with water and successfully painted.

The invention now permits reaction-injection molding using urethane materials and providing multiple releases from the mold, with the systems that are both reinforced and unreinforced. The invention permits the RIM machines to operate at substantially greater speeds and substantially enhances their productivity through the reduction of down time due to removal of mold release buildups, and reapplications of the release agents. The parts released from molds treated with the system of this invention have a consistent cosmetic appearance that may be easily cleaned and painted.

Although we have described a specifically preferred embodiment of the invention, other embodiments may be developed without departing from the spirit and scope of the following claims.

What is claimed is:

1. A unitary two-coat mold release system for sequential application to a mold surface, comprising:
   a first coating material comprising a carboxy-terminated silicone, a bonding and cross-linking agent reactive with the carboxy-terminated silicone and capable of providing bonding with a water-soluble, metallic salt of a long chain fatty acid and a volatile carrier for said carbonxy-terminated silicone and said bonding and cross-linking agent, said first coating material being adapted for coating a mold surface and providing a base for a second coating material, and
   a second coating material comprising a water-soluble, metallic salt of a long chain fatty acid in a deionized wster-alcohol solution.

2. The two-coat mold release system of claim 1 wherein the bonding and cross-linking agent is a titanate.

3. The two-coat mold release system of claim 2 wherein said carboxy-terminated silicone and said bonding and cross-linking agent comprise from about 0.7 percent to about 11.0 percent by weight of the first coating material, and the weight ratio of carboxy-terminated silicone to bonding and cross-linking agent varies from about 20:1 to about 2:1.

4. The two-coat mold release system of claim: 3 wherein the carboxy-terminated silicone and bonding and cross-linking agent comprise about 5.5 percent to about 11.0 percent by weight of the first coating material and the weight ratio of carboxy-terminated silicone to bonding and cross-linking agent varies from about 20:1 to 10:1.

5. The two-coat mold release system of claim 2 wherein said bonding and cross-linking agent is tetraisopropyltitanate.

6. The two-coat mold release system of claim 5 wherein the carrier is a mixture of an aliphatic hydrocarbon and a chloro-fluorocarbon.

7. The two-coat mold release system of claim 1 wherein the water-soluble, metallic salt of a long chain fatty acid of the second coating material is about 4 percent by weight of sodium myristate, in a solution including deionized water and isopropyl alcohol and having a pH adjusted to be in the range of about 8.9 to about 9.0, and wherein the solution further includes a non-ionic fluorochemical surfactant.

8. A unitary two-coat mold release system for sequential application to release from a mold surface urethane materials, comprising:
   a base coating material for said mold surface including a carboxy-terminated silicone, and a bonding agent providing bonding for the carboxy-terminated silicone and water-soluble, metallic salts of long-chain fatty acids and said mold surface, and a vaporizable liquid carrier for the carboxy-terminated silicone and bonding agent, and
   a top coating material for said mild surface including a water-soluble, metallic salt of a long-chain fatty acid capable of bonding to the bonding agent of the base coat and a vaporizable liquid carrier for said water-soluble, metallic salt of a long-chain fatty acid.

9. The two-coat mold release system of claim 8 wherein the top coating material includes a surfactant and the liquid carrier for said water-soluble, metallic salt of a long-chain fatty acid includes a solution of deionized water and alcohol with a pH adjusted to be between 8.5 and 9.5.

10. The two-coat mold release system of claim 9 wherein the water-soluble, metallic salt of a long-chain fatty acid comprises about 4-percent by weight of the solution.

11. A unitary two-coat mold release system: for sequential application to a mold surface, comprising:
    a top coating material for said mold surface including a water-soluble, metallic salt of a long-chain fatty acid for providing a releasing interface for molded articles; and
    a base coating material for said mold surface including a silicone polymer release agent and a bonding and cross-linking agent, said bonding and cross-linking agent being reactive with said silicone polymer release agent and providing bonding between said base coating and said mold surface and between said base coating and said top coating.

12. A two-coat mold release system as recited in claim 11 wherein said water-soluble metallic salt of a long chain fatty acid is selected from the group consisting of sodium myristate and sodium oleate.

13. A two-coat mold release system as recited in claim 11 wherein said top coating further includes a sodium sulfate of a long-chain fatty alcohol.

14. A two-coat mold release system as recited in claim 13 wherein said water-soluble metallic salt of a long-chain fatty acid is sodium myristate, and wherein said sodium sulfate of a long-chain fatty alcohol comprises sodium lauryl sulfate.

15. A two-coat mold release system as recited in claim 11 wherein said water-soluble metallic salt of a long-chain fatty acid comprises from about 2 percent to about 15 percent by weight of sodium myristate in a solution of deionized water and alcohol.

16. A two-coat mold release system as recited in claim 15 wherein said solution of deionized water and alcohol has a pH adjusted to be in the range of about 8.5 to about 9.5, and wherein said solution further includes a non-ionic fluorochemical surfactant.

17. A two-coat mold release system as recited in claim 11 wherein said bonding and cross-linking agent comprises a titanate.

18. A two-coat mold release system as recited in claim 17 wherein said silicone polymer release agent comprises carboxy-terminated silicone.

19. A two-coat mold release system as recited in claim 18 wherein said titanate comprises tetraisopropyltitanate.

20. A two-coat mold release system as recited in claim 11 wherein said silicone polymer release agent and said bonding and cross-linking agent comprise from about 0.7 percent to about 11 percent by weight of said base coating material, and wherein the weight ratio of silicone polymer release agent to bonding and cross-linking agent varies from about 20:1 to about 2:1.

21. A two-coat mold release system as recited in claim 20 wherein said silicone polymer release agent and said bonding and cross-linking agent comprise from about 5.5 percent to about 11 percent by weight of said base coating material, and wherein the weight ratio of silicone polymer release agent to bonding and cross-linking agent varies from about 20:1 to about 10:1.

22. A two-coat mold release system as recited in claim 11 wherein said base coating material further includes a volatile carrier for said silicone polymer release agent and said bonding and cross-linking agent.

23. A tow-coat mold release system as recited in claim 22 wherein said carrier comprises a mixture of an aliphatic hydrocarbon and a chloro-fluorocarbon.

24. A water-soluble coating for use as the top coating material of a unitary two-coat mold release system for sequential application to a mold surface, comprising a solution of sodium myristate and a small amount of non-ionic fluorochemical surfactant in deionized water and alcohol, said deionized water and alcohol having a pH adjusted to be from about 8.9 to about 9.0, and said sodium myristate being present in an amount of about 4 percent by weight.

* * * * *

UNITED STATES PATENT AND TRADEMARK OFFICE
CERTIFICATE OF CORRECTION

PATENT NO. : 4,602,060
DATED : JULY 22, 1986
INVENTOR(S) : SHELDON L. CLARK AND FRANK P. PAJAUJIS

It is certified that error appears in the above-identified patent and that said Letters Patent is hereby corrected as shown below:

In col. 3, line 10, delete "Cobtained" and insert -- obtained -- therefor.

In col. 7, line 64, delete "placues" and insert -- placques --.

In col. 9, line 65 (claim 8, line 11), delete "mild" and insert -- mold -- therefor.

In col. 10, line 13, (claim 11, line 1), delete ":".

In col. 11, line 7, (claim 23, line 1), delete "tow", and insert -- two -- therefor.

Signed and Sealed this

Twenty-third Day of December, 1986

Attest:

DONALD J. QUIGG

*Attesting Officer*   *Commissioner of Patents and Trademarks*